(12) United States Patent
Gerdes et al.

(10) Patent No.: US 10,940,842 B2
(45) Date of Patent: Mar. 9, 2021

(54) EVALUATION AND/OR CONTROL DEVICE AND METHOD FOR ASCERTAINING INFORMATION RELATING TO A MECHANICALLY EFFECTIVE POWER OF AN ACTIVE BRAKE BOOSTER

(71) Applicant: Robert Bosch GmbH, Stuttgart (DE)

(72) Inventors: Manfred Gerdes, Vaihingen/Enz (DE); Vairavan Arunachalam, Tiruchirappalli (IN)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 16/302,212

(22) PCT Filed: Apr. 12, 2017

(86) PCT No.: PCT/EP2017/058750
§ 371 (c)(1),
(2) Date: Nov. 16, 2018

(87) PCT Pub. No.: WO2017/215811
PCT Pub. Date: Dec. 21, 2017

(65) Prior Publication Data
US 2019/0210579 A1    Jul. 11, 2019

(30) Foreign Application Priority Data

Jun. 15, 2016   (DE) .................... 10 2016 210 605.8

(51) Int. Cl.
*B60T 13/16* (2006.01)
*B60T 17/22* (2006.01)
(Continued)

(52) U.S. Cl.
CPC .......... *B60T 13/166* (2013.01); *B60T 13/145* (2013.01); *B60T 13/686* (2013.01); *B60T 17/221* (2013.01); *B60T 13/143* (2013.01); *B60T 13/662* (2013.01)

(58) Field of Classification Search
CPC .......... B60T 1/10; B60T 7/042; B60T 8/4077; B60T 8/4872; B60T 13/575; B60T 13/662; B60T 13/745
(Continued)

(56) References Cited

U.S. PATENT DOCUMENTS

2011/0178687 A1    7/2011  Anderson et al.
2013/0047593 A1*   2/2013  Weiberle ................... B60T 1/10
                                                                60/327
(Continued)

FOREIGN PATENT DOCUMENTS

DE    202010017605 U1   10/2012
DE    102013208672 A1   11/2014
(Continued)

OTHER PUBLICATIONS

International Search Report for PCT/EP2017/058750, dated Jul. 14, 2017.

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A method for ascertaining information relating to a mechanically effective power of an active brake booster of a braking system of a vehicle, including: ascertaining a first piece of information relating to an assisting force that is effectuated with the aid of the operated active brake booster, ascertaining a second piece of information relating to a pressure force in a master brake cylinder of the braking system, situated (Continued)

downstream from the active brake booster, the pressure force acting counter to the operated active brake booster, ascertaining a third piece of information relating to a spring force of at least one spring of the active brake booster and/or of the braking system, the spring force acting counter to the operated active brake booster, and establishing the information relating to the mechanically effective power of the active brake booster, taking into consideration the first, second, and third pieces of information.

11 Claims, 3 Drawing Sheets

(51) Int. Cl.
  B60T 13/68 (2006.01)
  B60T 13/14 (2006.01)
  B60T 13/66 (2006.01)
(58) Field of Classification Search
  USPC ..................................................... 303/114.1
  See application file for complete search history.

(56) References Cited

U.S. PATENT DOCUMENTS

| 2013/0127237 | A1* | 5/2013 | Pfeiffer | B60T 8/4018 |
| | | | | 303/6.01 |
| 2014/0028083 | A1* | 1/2014 | Gerdes | B60T 1/10 |
| | | | | 303/6.01 |
| 2014/0214297 | A1* | 7/2014 | Foitzik | B60T 7/042 |
| | | | | 701/70 |
| 2014/0319902 | A1* | 10/2014 | Benzler | B60T 13/586 |
| | | | | 303/6.01 |
| 2015/0307072 | A1* | 10/2015 | Strengert | B60T 13/662 |
| | | | | 303/81 |
| 2016/0200309 | A1* | 7/2016 | Svensson | B60T 13/686 |
| | | | | 303/15 |

FOREIGN PATENT DOCUMENTS

| DE | 102014211008 A1 | 12/2015 |
| JP | 2013010372 A | 1/2013 |
| WO | 2011098178 A1 | 8/2011 |

* cited by examiner

EVALUATION AND/OR CONTROL DEVICE AND METHOD FOR ASCERTAINING INFORMATION RELATING TO A MECHANICALLY EFFECTIVE POWER OF AN ACTIVE BRAKE BOOSTER

FIELD

The present invention relates to a method for ascertaining information relating to a mechanically effective power of an active brake booster of a braking system of a vehicle. The present invention also relates to methods for operating an active brake booster of a braking system of a vehicle. In addition, the present invention relates to an evaluation and/or control device for at least one active brake booster of a braking system of a vehicle, to an active brake booster for a braking system of a vehicle, and to a braking system for a vehicle.

BACKGROUND INFORMATION

German Patent Application No. DE 10 2014 211 008 A1 describes a sensor device and a method for carrying out or boosting an autonomous brake pressure build-up with the aid of an active brake booster. The aim is to be able to detect, with the aid of the sensor device and/or the corresponding method, a blocking of a brake pedal connected to the active brake booster that occurs during the autonomous brake pressure build-up. For this purpose, during the autonomous brake pressure build-up, a tensile force on the brake pedal that acts counter to the active brake booster is ascertained by subtracting, from an estimated value of an assisting force applied by the active brake booster, a pressure force that exists in a connected master brake cylinder and a restoring force of at least one spring of the braking system. It is then ascertained whether the tensile force lies within a normal value range, which is established by taking into consideration at least one differential movement between a pedal force transmission component connected to the brake pedal and an assisting force transmission component situated on the active brake booster. If the tensile force in question lies outside of the normal value range, it is established that the brake pedal is blocked.

SUMMARY

The present invention provides a method for ascertaining a piece of information relating to a mechanically effective power of an active brake booster of a braking system of a vehicle, a method for operating an active brake booster of a braking system of a vehicle, a method for operating an active brake booster of a braking system of a vehicle, an evaluation and/or control device for at least one active brake booster of a braking system of a vehicle, an active brake booster for a braking system of a vehicle, and a braking system for a vehicle.

The present invention enables easily executable options for ascertaining a reliable piece of information relating to a mechanically effective power of the respective active brake booster. Particularly with regard to a friction loss that occurs on and/or in the respective active brake booster, such as for example with regard to a friction loss that occurs in a transmission of the active brake booster, the information may be reliably obtained with the aid of the present invention even though the friction loss (occurring in particular in the transmission) is temperature-dependent. However, the present invention can not only be used to detect friction losses, but rather also be used to detect tolerance-dependent losses, such as for example due to air gaps, model errors, model inaccuracies, temperature-dependent inaccuracies and/or effects. Operation of the respective active brake booster may thus be better monitored and controlled. It is also pointed out that, in order to implement/utilize the present invention, there is no need to measure the temperature on and/or in the active brake booster, for example in order to detect temperature-dependent friction losses. By obtaining the information relating to the mechanically effective power of the respective active brake booster, the present invention helps to make it possible for the respective active brake booster to be used in a safe and improved manner, for example for automated/autonomous brake application that is carried out or assisted by the active brake booster, without an additional sensor, such as a temperature sensor for example, having to be integrated on and/or in the active brake booster for this purpose.

In one advantageous specific embodiment of the method, at least one correction value is established for ascertaining an assisting force that is actually effectuated by the operated active brake booster and/or for predefining a setpoint operating mode of the active brake booster as at least part of the information relating to the mechanically effective power of the active brake booster. The piece of information relating to the mechanically effective power of the active brake booster may thus be used to detect in a more reliable manner, with the aid of the assisting force that is actually effectuated by the active brake booster, a possible blocking of the active brake booster and/or of a brake actuation element connected thereto. The piece of information obtained with the aid of the present invention relating to the mechanically effective power of the active brake booster may also be used for improved control of the active brake booster.

For example, the information relating to the mechanically effective power of the active brake booster and/or at least one initial value for the correction value may be established as a quotient of a sum of the pressure force ascertained as a second piece of information and of the spring force ascertained as a third piece of information, divided by the assisting force ascertained as the first piece of information. A quick and easy computing step may thus be carried out in order to establish the information relating to the mechanically effective power of the active brake booster and/or at least the initial value for the correction value.

Optionally, a correction value that is averaged over time and/or that is limited to a predefined correction value range may be established as the correction value. By averaging over time and/or by a limitation to the predefined correction value range, it is possible to exclude extreme values for the correction value.

The advantages described above may also be achieved by carrying out at least one of the methods for operating an active brake booster of a braking system of a vehicle. It is pointed out that these methods are each refinable according to the above specific embodiments.

In one advantageous specific embodiment of the method for operating an active brake booster of a braking system of a vehicle, a possible blocking of the active brake booster and/or of a brake actuation element connected to the active brake booster is ascertained by evaluating at least one ascertained sensor variable relating to a differential movement between an assisting force transmission component of the active brake booster and a driver braking force transmission component of the braking system and the assisting force that is actually effectuated with the aid of the operated active brake booster. By evaluating the at least one ascertained sensor variable and the assisting force that is actually effectuated, it is possible to make a clear distinction between deformations that may be attributed to blocking of the active brake booster and/or the brake actuation element and those error signals/deformations that occur due to high pressures in the braking system. This specific embodiment of the present invention thus enables a reliable detection of a blocking that has occurred, without high pressures in the braking system resulting in false assumptions of blocking of the active brake booster and/or of the brake actuation element. This specific embodiment of the present invention thus helps both to increase an operating safety standard of the active brake booster and to increase the usability of operation of the active brake booster, in particular for an automated/autonomous brake application that is assisted or carried out with the aid of the active brake booster.

The advantages described above are also achieved in a corresponding evaluation and/or control device for at least one active brake booster of a braking system of a vehicle. It is expressly pointed out that the evaluation and/or control device may be configured to carry out all methods described above.

An active brake booster for a braking system of a vehicle, which includes such an evaluation and/or control device, also ensures the advantages described above.

In one advantageous specific embodiment of the active brake booster, the latter includes an assisting force transmission component which may be moved in a braking direction by the active brake booster that is actuated with the aid of the evaluation and/or control device, and a driver braking force transmission component which is connected to the assisting force transmission component in such a way that the assisting force transmission component, which is moved in the braking direction, may be moved until a differential movement between the driver braking force transmission component and the assisting force transmission component is reached that is equal to a predefined limiting differential movement with respect to the driver braking force transmission component, and thereafter the driver braking force transmission component may be conjointly moved by the assisting force transmission component, which is moved in the braking direction, for as long as the conjoint movement of the driver braking force transmission component in the braking direction is counteracted by at most a retention force below a predefined threshold value. Such an active brake booster may advantageously be used to assist or carry out an automated/autonomous brake application.

Preferably, at least one buffer element or spring element is situated on the driver braking force transmission component and/or on the assisting force transmission component in such a way that if, during the movement of the assisting force transmission component in the braking direction, the conjoint movement of the driver braking force transmission component in the braking direction is counteracted by a retention force above the predefined threshold value, the differential movement between the assisting force transmission component, which is moved in the braking direction, and the driver braking force transmission component may be increased with the aid of a deformation of the at least one buffer element or spring element beyond the predefined limiting differential movement. The increase in the retention force above the predefined threshold value may thus easily be ascertained by the increase in the differential movement that occurs as a result of the deformation of the at least one buffer element or spring element. By using the actual assisting force of the active brake booster, which may easily be determined by the present invention, it is additionally possible to verify that the increase in the differential movement is truly due to blocking of the active brake booster and/or of the brake actuation element, and not to extreme pressures in the braking system. Measures may therefore be taken in good time in order to prevent damage to property or injury to a person in such a situation.

In addition, a braking system for a vehicle including such an evaluation and/or control device or a corresponding active brake booster also yields the advantages described above. Such a braking system is also refinable according to the above embodiments.

BRIEF DESCRIPTION OF THE DRAWINGS

Further features and advantages of the present invention are explained below with reference to the figures.

DETAILED DESCRIPTION OF EXAMPLE EMBODIMENTS

Figure 1:
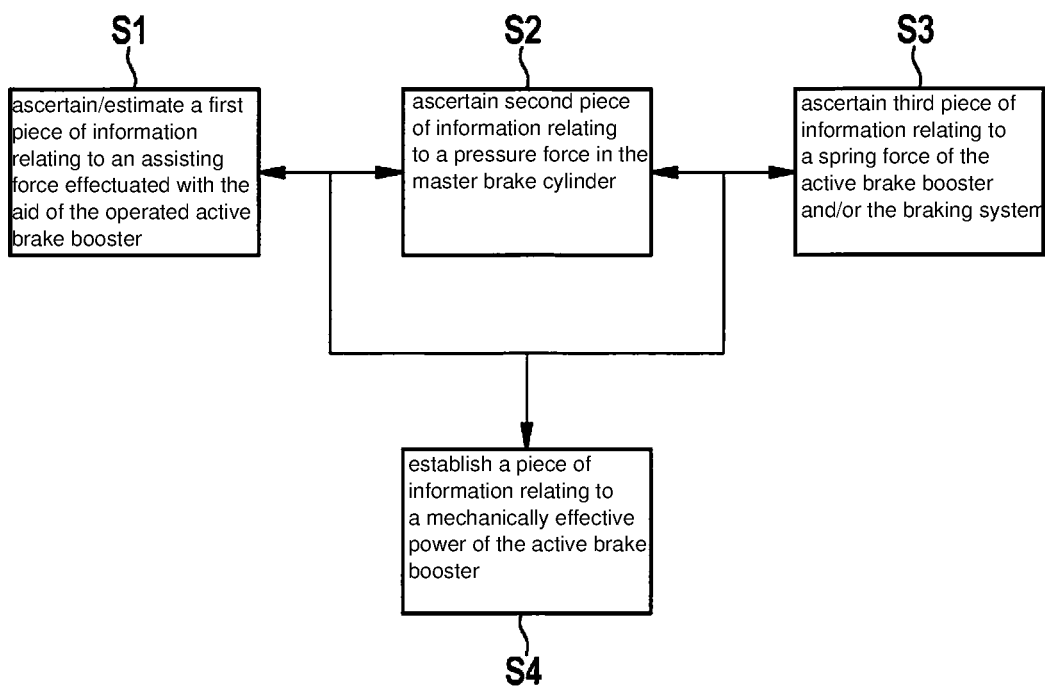
FIG. 1 shows a flow chart to explain one specific embodiment of the method for ascertaining information relating to a mechanically effective power of an active brake booster of a braking system of a vehicle.

FIG. 1 shows a flow chart to explain an embodiment of the method for ascertaining information relating to a mechanically effective power of an active brake booster of a braking system of a vehicle.

The active brake booster may be understood to mean a brake booster equipped with an electric motor, in particular an electromechanical brake booster. Preferably, the active brake booster is situated upstream from a master brake cylinder of the (hydraulic) braking system in such a way that operation of the electric motor causes at least one piston of the master brake cylinder to move at least partially into the master brake cylinder and thereby effectuates an increase in pressure in at least one chamber of the master brake cylinder. It is pointed out that implementation of the method is not limited either to a particular type of brake booster or to a particular type of braking system equipped with the active brake booster or to a specific type of vehicle/motor vehicle equipped with the active brake booster/braking system.

In a method step S1, a first piece of information relating to an assisting force effectuated with the aid of the operated active brake booster is ascertained/estimated. The first piece of information may be, for example, at least one measured variable ascertained on the active brake booster, especially at least one measured variable ascertained on the electric motor of the active brake booster. The first piece of information may also be ascertained/established/estimated by taking into consideration the at least one measured variable ascertained on the active brake booster, especially on its electric motor. Preferably, a motor torque M of the electric motor of the active brake booster, which is measured with the aid of a sensor, is evaluated in order to ascertain/establish/estimate the first piece of information. In particular, in method step S1, an estimated value $F_{sup}$ for the assisting force may be ascertained as first piece of information according to the following equation (equation 1):

$$F_{sup} = M * i * \mu_1; \qquad \text{(equation 1)}$$

where i is a gear ratio and $\mu_1$ is an efficiency of the active brake booster.

As an alternative or in addition, at least one control variable for establishing a setpoint operation of the active brake booster, with the aid of which the active brake booster is actuated, may also be ascertained as first piece of information or evaluated in order to ascertain the first piece of information. The at least one control variable may be, for example, a current and/or voltage that is supplied to the electric motor of the active brake booster. However, it is pointed out that the examples described here for implementing method step S1 are not to be interpreted as limiting.

In a method step S2, a second piece of information is ascertained relating to a pressure force $F_p$ in the master brake cylinder, situated downstream from the active brake booster, the pressure force acting counter to the operated active brake booster. By way of example, an internal pressure p in the at least one chamber of the master brake cylinder may be measured (directly or indirectly) with the aid of a pressure sensor. The pressure force $F_p$ may then be ascertained as second piece of information by the following equation (equation 2):

$$F_p = p*A*\mu_2; \quad \text{(equation 2)}$$

where $\mu_2$ is an efficiency of the master brake cylinder, and A is a surface area with which the at least one movable piston exerts a braking effect in the master brake cylinder. The surface area A may be established from a diameter $\delta$ of the master brake cylinder using the following equation (equation 3):

$$A = \pi*\delta^2/4; \quad \text{(equation 3)}$$

In a further method step S3, a third piece of information is ascertained relating to a spring force $F_s$ of at least one spring of the active brake booster and/or of the braking system, the spring force acting counter to the operated active brake booster. To this end, a known spring property of the at least one spring and a travel of at least one movable component of the active brake booster and/or of the braking system, such as for example of a driver braking force transmission component (for transmitting a driver braking force that is exerted on a brake actuation element/brake pedal) and/or of an assisting force transmission component (for transmitting the assisting force that is effectuated with the aid of the active brake booster) may be evaluated. Preferably, the driver braking force transmission component is an input rod of the braking system. The assisting force transmission component may be understood to mean a valve body of the active brake booster. However, implementation of the method described here is not limited to the aforementioned examples for the driver braking force transmission component and the assisting force transmission component.

Method steps S1 through S3 may be carried out in any order. In addition, at least two of method steps S1 through S3 may be carried out simultaneously or with a temporal overlap.

Then, in a method step S4, a piece of information $I_{fric}$ relating to a mechanically effective power of the active brake booster is established. This takes place by taking into consideration at least the first piece of information, the second piece of information and the third piece of information. For example, the piece of information relating to the mechanically effective power of the active brake booster is established by taking into consideration a quotient of a sum of the pressure force $F_p$ ascertained as second piece of information and of the spring force $F_s$ ascertained as third piece of information, divided by the assisting force ascertained as first piece of information (or the ascertained estimated value $F_{sup}$ of the assisting force), according to the following equation (equation 4):

$$I_{fric} \sim (F_p + F_s)/F_{sup} \quad \text{(equation 4)}$$

As an advantageous refinement, at least one method step of the method described below may also be integrated into the method described here.

Figure 2:
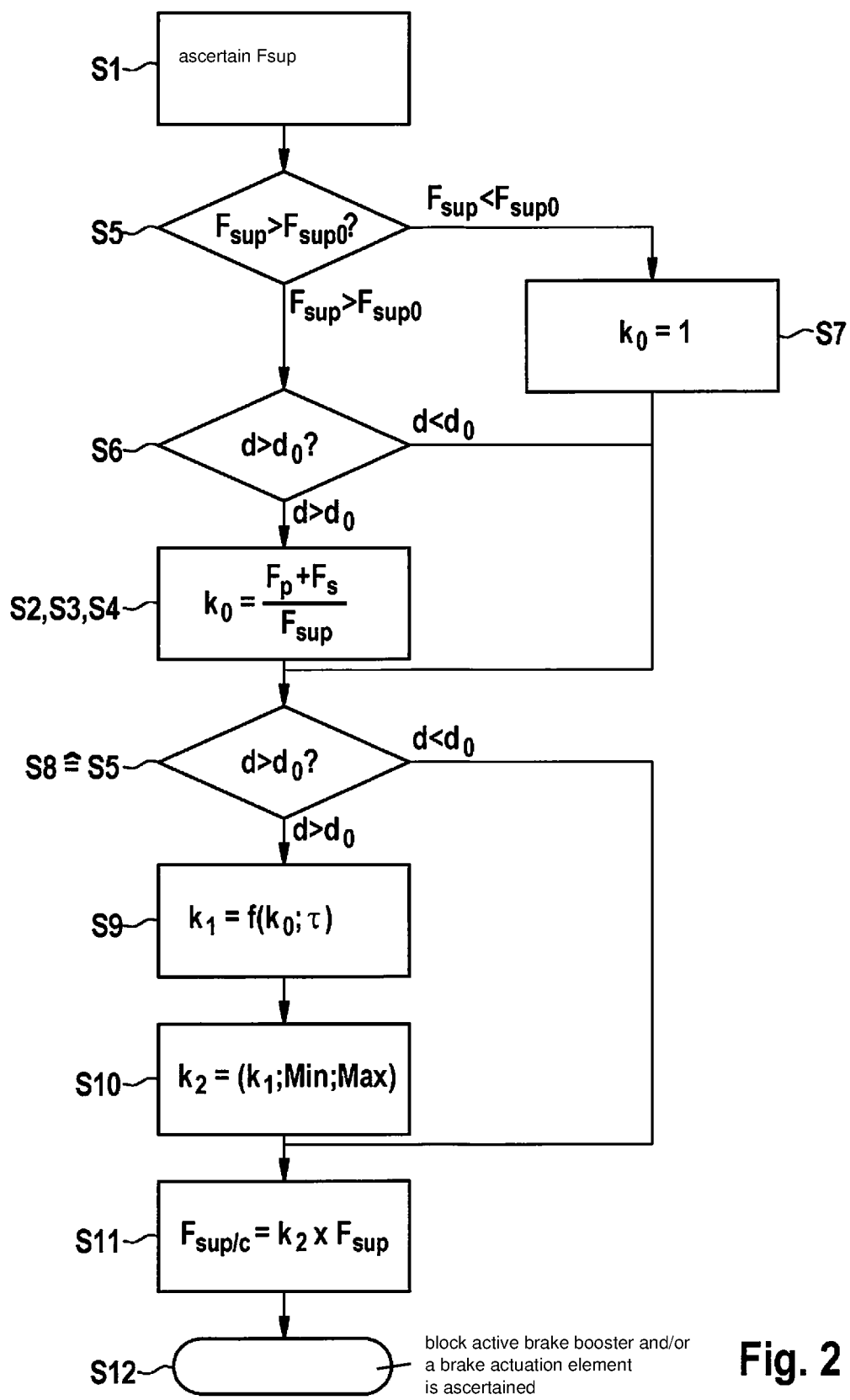
FIG. 2 shows a flow chart to explain one specific embodiment of the method for operating an active brake booster of a braking system of a vehicle.

FIG. 2 shows a flow chart to explain a specific embodiment of the method for operating an active brake booster of a braking system of a vehicle.

It is expressly pointed out that implementation of the method described below does not require any particular type of active brake booster. In addition, the active brake booster used to implement the method described below may be integrated into a multitude of different types of braking systems or types of vehicles/motor vehicles.

The method is used to determine an assisting force $F_{sup/c}$ that is actually effectuated by the operated active brake booster. An assisting force $F_{sup/c}$ that is actually effectuated by the operated active brake booster may be understood to mean an assisting force of the active brake booster that is corrected (for example with regard to a friction loss that occurs on and/or in the active brake booster) and/or a "loss-adjusted assisting force" ("friction-loss-adjusted assisting force") of the active brake booster.

In order to determine the assisting force $F_{sup/c}$ that is actually effectuated by the operated active brake booster, an estimated value $F_{sup}$ of the assisting force is first ascertained as the above-described method step S1. To this end, use may be made of the variables and/or equation (equation 1) already described above.

In an optional method step S5, it is examined whether the estimated value $F_{sup}$ of the assisting force is greater than a predefined assisting force limiting value $F_{sup0}$. Method step S5 may be carried out in order to filter out low values for the estimated value $F_{sup}$ of the assisting force. The assisting force limiting value $F_{sup0}$ may be predefined/established accordingly.

If the estimated value $F_{sup}$ of the assisting force is greater than the assisting force limiting value $F_{sup0}$, then in the specific embodiment described here a differential movement d between an assisting force transmission component of the active brake booster and a driver braking force transmission component of the braking system is compared with a predefined limiting differential movement d0 in an optional method step S6. (For example, the driver braking force transmission component may be an input rod of the braking system and/or the assisting force transmission component may be a valve body of the active brake booster.) With the aid of method step S6, a low-force state may be detected, in which no strong brake application is being carried out by the active brake booster.

If the differential movement d is greater than the limiting differential movement d0, the above-described method steps S2 through S4 are carried out. During this, an initial value $k_0$ is established for a correction value $k_2$ for ascertaining the assisting force $F_{sup/c}$ that is actually effectuated by the operated active brake booster. The initial value $k_0$ may be established according to the following equation (equation 5):

$$k_0 = (F_p + F_s)/F_{sup} \quad \text{(equation 5)}$$

The pressure force $F_p$ ascertained for example according to an equation (equation 2) is often obtained only with a time offset, which may be attributed to a time taken to measure internal pressure p in the at least one chamber of the master brake cylinder. In this case, estimated value $F_{sup}$ of the assisting force and/or spring force $F_s$ may be "corrected" in accordance with the time offset before being used in the equation (equation 5).

Method steps S2 through S4 are preferably carried out only if estimated value $F_{sup}$ of the assisting force is greater than the assisting force limiting value $F_{sup0}$ and differential movement d is greater than the limiting differential movement $d_0$. If estimated value $F_{sup}$ of the assisting force is lower than the assisting force limiting value $F_{sup0}$ and/or differential movement d is smaller than the limiting differential movement $d_0$, a method step S7 may be carried out, in which initial value $k_0$ is set to the value 1. In one alternative specific embodiment, however, method steps S2 through S4 may also be carried out regardless of whether estimated value $F_{sup}$ of the assisting force is lower than the assisting force limiting value $F_{sup0}$ and/or the differential movement d is smaller than the limiting differential movement $d_0$.

After method steps S2 through S4 or after method step S7, in the specific embodiment described here method step S5 is repeated as an optional method step S8. If differential movement d is larger than the limiting differential movement $d_0$, a correction mean value $k_1$ is determined as a correction value averaged over time (over a mean value time τ) as method step S9. Thereafter, in a method step S10, correction value $k_2$ is established by limiting the time-averaged correction mean value $k_1$ to a predefined correction value range (from a predefined correction value minimum Min to a predefined correction value maximum Max). However, method steps S9 and S10 may also be omitted.

If it is established in method step S8 that differential movement d is smaller than the limiting differential movement $d_0$, method steps S9 and S10 are bypassed in the specific embodiment described here. Instead, a method step S11 is carried out directly, in which assisting force $F_{sup/c}$ that is actually effectuated by the operated active brake booster is determined, additionally taking into consideration correction value $k_2$. This takes place for example according to the following equation (equation 6):

$$F_{sup/c} = k_2 * F_{sup} \quad \text{(equation 6)}$$

Even deviations of estimated value $F_{sup}$ of the assisting force from assisting force $F_{sup/c}$ that is actually effectuated by the active brake booster by up to 30% may be corrected with the aid of method step S11. Such a correction is advantageous since often a temperature-dependent friction loss occurs on and/or in the active brake booster, in particular in a transmission of the active brake booster.

The method explained here may also be described in such a way that a balance of forces is evaluated in the low-force state and correction factor $k_0$, $k_1$ or $k_2$ thus determined is used in the final calculation of the balance of forces. Correction value $k_0$, $k_1$ or $k_2$ determined in the low-force state may also be used in the high-force state to equalize the balance of forces and to determine the "effective assisting force" $F_{sup/c}$ in each situation.

In the method explained here, preferably a method step S12 is also carried out, in which a possible blocking of the active brake booster and/or of a brake actuation element connected to the active brake booster is ascertained. This takes place by evaluating differential movement d (or an ascertained sensor variable relating to a differential movement d) and assisting force $F_{sup/c}$ that is actually effectuated by the operated active brake booster. This enables a (redundant) sensing of the possible blocking using the differential movement sensor and the friction-loss-adjusted assisting force $F_{sup/c}$ of the active brake booster. By using the friction-loss-adjusted assisting force $F_{sup/c}$, it is possible to avoid erroneous detections in which high pressures in the master brake cylinder result in the false assumption of blocking (when this is in fact not the case). In addition, using the friction-loss-adjusted assisting force $F_{sup/c}$ (instead of estimated value $F_{sup}$) ensures that friction losses have no effect on the examination of possible blocking. In particular, a model adjustment is thus possible, which prevents an excessively slow or inaccurate response of the active brake booster from being interpreted in every situation as blocking (when this is in fact not the case).

In an alternative or supplementary method, the ascertained correction value $k_0$, $k_1$ or $k_2$ may also be used to establish a setpoint variable for a setpoint operating mode that is to be carried out by the active brake booster. By taking into consideration a setpoint vehicle deceleration that is requested by a driver of the vehicle or by a speed controller of the vehicle, and by additionally taking into consideration the correction value, the setpoint operating mode may be established in a "friction-loss-adjusted" manner. When the active brake booster is actuated in such a way that the active brake booster is operated in an actual operating mode corresponding to the established setpoint variable, reliable performance of the requested setpoint vehicle deceleration is thus ensured. For example, a setpoint motor torque to be implemented by a motor of the active brake booster is established as the setpoint variable.

Figure 3:
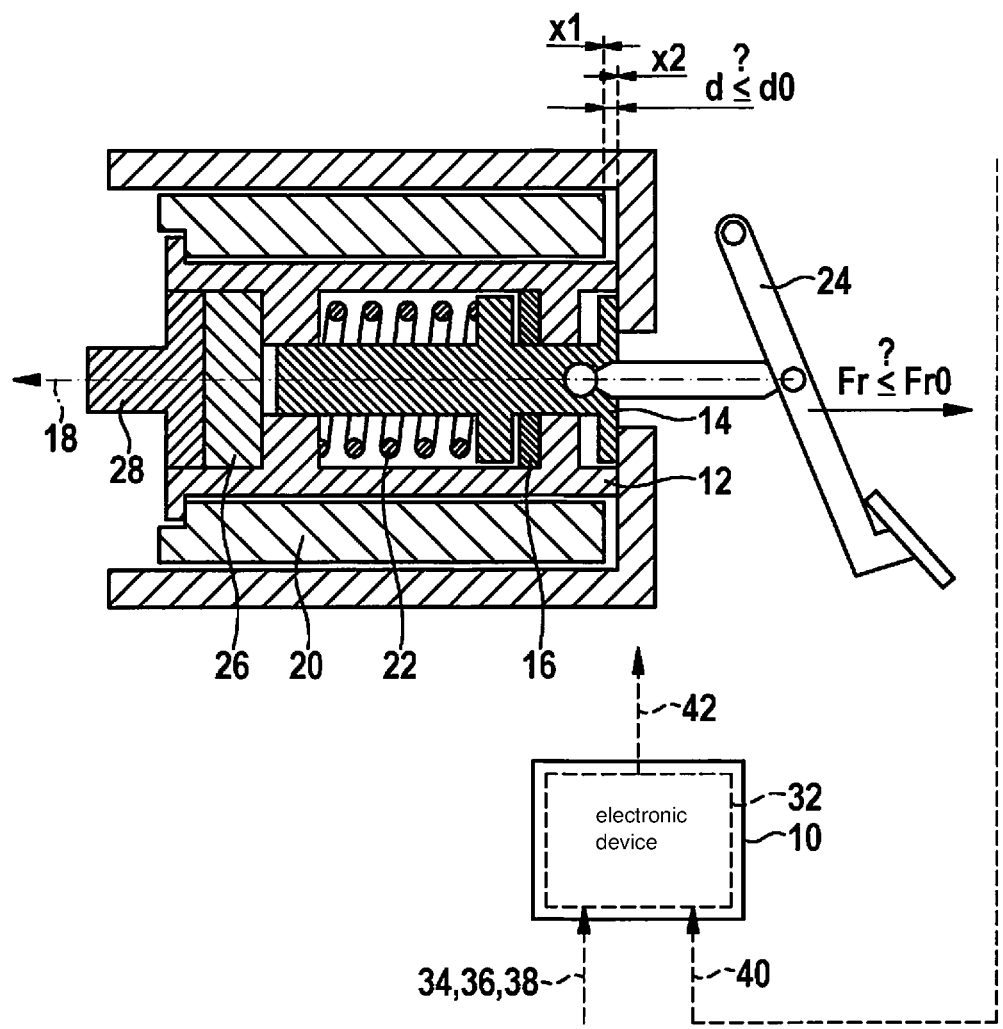
FIG. 3 shows a schematic diagram of one specific embodiment of the evaluation and/or control device, and of the active brake booster equipped therewith.

FIG. 3 shows a schematic diagram of a specific embodiment of the evaluation and/or control device and of the active brake booster equipped therewith.

The evaluation and/or control device 10 schematically shown in FIG. 3, and the active brake booster equipped therewith, are not limited to use on a particular type of braking system. Purely by way of example, the active brake booster is an electromechanical brake booster. In addition, it is pointed out that a braking system equipped with the evaluation and/or control device 10 or with the corresponding electromechanical brake booster may be used in a multitude of different types of vehicles/motor vehicles.

By way of example, in the specific embodiment of FIG. 3, the evaluation and/or control device 10 is integrated as control electronics into the electromechanical brake booster. As an alternative to this, however, the evaluation and/or control device 10 may also be situated outside of the electromechanical brake booster. In both cases, the evaluation and/or control device 10 may also (as an advantageous refinement) be designed to actuate further components of the braking system equipped with the electromechanical brake booster.

The electromechanical brake booster includes (in addition to the evaluation and/or control device 10) a valve body 12 as an assisting force transmission component and an input rod 14 as a driver braking force transmission component. The electromechanical brake booster shown in FIG. 3 additionally includes at least one buffer element and/or spring element 16, which is situated on input rod 14 and/or on the valve body 12 and the functioning of which will be discussed in greater detail below. Valve body 12 is movable at least in a braking direction 18 by the operation of a motor (not shown) of the electromechanical brake booster. This may also be described in such a way that valve body 12 is movable in braking direction 18 from its (force-free) starting position with the aid of a booster travel x1 by an assisting force that is exerted thereon by the motor. By way of example, in the specific embodiment described here, valve body 12 is connected to the motor via at least one boost body 20 in such a way that valve body 12 may be moved in braking direction 18 with the aid of a movement of boost body 20 that is effectuated by the operation of the motor. As an alternative or in addition to boost body 20, valve body 12 may also be connected to the motor via a thread (not shown).

In the specific embodiment described here, input rod 14 is supported on valve body 12 via a return spring 22. However, it is pointed out that equipping the electromechanical brake booster with return spring 22 is purely optional. As shown in FIG. 3, a brake actuation element 24, such as a brake pedal 24 for example, may be or is connected to input rod 14. As a result of brake actuation element 24 being actuated by a driver, a driver braking force is transmittable to input rod 14. With the aid of the transmitted driver braking force, input rod 14 may be moved from its (force-free) starting position by an input rod travel x2.

In the illustrated specific embodiment, input rod 14 and the valve body 12 each make contact with a first side of a reaction disk 26. An output rod 28 (shown only in part) is situated on a second side of reaction disk 26, which is opposite the first side. Output rod 28 may be moved by the driver braking force transmitted thereto via input rod 14 and/or by the assisting force of the motor of the electromechanical brake booster, which is transmitted thereto via valve body 12, in such a way that a master brake cylinder pressure may be increased in at least one master brake cylinder situated on the electromechanical brake booster. However, since use of the electromechanical brake booster is not limited to a particular type of master brake cylinder cooperating therewith, the master brake cylinder is not shown in FIG. 3. In addition, it is pointed out that equipping the electromechanical brake booster with reaction disk 26 and output rod 28, as shown in FIG. 3, is to be interpreted purely by way of example.

FIG. 3 shows a schematic diagram of the electromechanical brake booster of FIG. 3 when the motor is in a deactivated state and when brake actuation element 24 is in its starting position, or when brake actuation element 24 is not being actuated by the driver. From the state shown in FIG. 3, the electromechanical brake booster may be activated for an automated/autonomous brake application. Automatic/autonomous brake application is to be understood to mean a procedure in which a brake pressure is built up in at least one wheel brake cylinder of the braking system equipped with the electromechanical brake booster, without brake actuation element 24 being actuated by the driver. For example, the automatic/autonomous brake application may be triggered by a speed controller. The speed controller may be understood to mean, for example, a driver assistance system (for example an ACC system, Adaptive Cruise Control system) and/or an emergency braking system (such as, for example, an AEB system, Autonomous Emergency Braking system). In particular, the electromechanical brake booster may be designed in such a way that a force/energy required to carry out the automatic/autonomous brake application may be mustered exclusively by the electromechanical brake booster, or by its motor. It is thus not necessary for the braking system equipped with the electromechanical brake booster to be equipped with a further motor device/hydraulic device for carrying out the automatic/autonomous brake application. The multifunctionality of the electromechanical brake booster thus reduces a space requirement, a weight and manufacturing costs of the braking system equipped therewith. Alternatively, however, the electromechanical brake booster may also be designed only to boost the automatic/autonomous brake application. In this case, the automatic/autonomous brake application takes place by a collaboration of the electromechanical brake booster with at least one valve of the braking system, at least one converter device of the braking system, such as a motorized plunger device for example, and/or at least one pump of the braking system.

In order to carry out/boost the automatic/autonomous brake application, valve body 12 is moved in braking direction 18 by operation of the motor. Input rod 14 is attached to valve body 12 in such a way that valve body 12, which is moved in the braking direction 18 (from its starting position), may be moved until a differential movement d between input rod 14 and valve body 12 is reached that is equal to a limiting differential movement do with respect to input rod 14. Differential movement d may be understood to mean, for example, a differential position of input rod 14 relative to valve body 12, which in particular is measurable directly by a differential movement sensor. (The differential movement may for example be defined equal to/by a difference between the booster travel x1 and the input rod travel x2, possibly also with a constant.)

As soon as valve body 12 has been moved by differential movement d equal to the limiting differential movement $d_0$, input rod 14 is conjointly movable in braking direction 18 by valve body 12 (which is moved in braking direction 18). Preferably, the conjoint movement of the input rod 14 in the braking direction 18 may be carried out while keeping differential movement d equal to limiting differential movement $d_0$. However, the conjoint movement of input rod 14 in braking direction 18 (together with valve body 12) occurs only for as long as the conjoint movement of input rod 14 in braking direction 18 is counteracted by at most a retention force Fr below a predefined threshold value $Fr_0$. Usually, the conjoint movement of input rod 14 in braking direction 18 effectuates a movement of brake actuation element 24 that is equal/similar to a corresponding actuation of brake actuation element 24 by the driver. The movement of brake actuation element 24 often takes place with a high dynamic. This is especially the case during automatic/autonomous full brake application.

However, it may occur that at least one object, such as for example a driver's foot, a bottle and/or a pet, is located close to brake actuation element 24. In particular, it is possible that the object in question protrudes at least partially into an intermediate space between brake actuation element 24 and an adjacent vehicle wall. Such a situation usually effectuates a force that is directed counter to the movement of brake actuation element 24. This also results in a retention force Fr on input rod 14, which acts counter to the conjoint movement of input rod 14 in the braking direction 18 (together with valve body 12). However, as long as no disruptive object is located at brake actuation element 24, retention force Fr acting on input rod 14 is usually below the predefined threshold value Fr0. (For example, retention force Fr below the predefined threshold value Fr0 may result from friction of input rod 14.)

If, however, an object protrudes into the intermediate gap between brake actuation element 24 and the adjacent vehicle wall component, usually an increased retention force Fr occurs as soon as there is slight contact between the brake actuation element 24 and the object in question. Threshold value Fr0 predefined on the electromechanical brake booster is advantageously set in such a way that retention force Fr that occurs as soon as there is slight contact between brake actuation element 24 and the object is above the predefined threshold value Fr0. However, since the electromechanical brake booster is equipped with the evaluation and/or control device 10 and with the at least one buffer element and/or spring element 16, it is reliably possible to prevent any jamming, crushing or forceful impacting of the object. The at least one buffer element and/or spring element 16 ensures that, if a retention force Fr that slightly exceeds the predefined threshold value Fr0 acts counter to the conjoint movement of input rod 14 in braking direction 18 during the movement of valve body 12 in braking direction 18, differential movement d between valve body 12, which is moved in the input braking direction 18, and input rod 14 may be increased beyond the predefined limiting differential movement d0 with the aid of a deformation of the at least one buffer element and/or spring element 16.

In addition, the evaluation and/or control device 10 may advantageously be used.

The evaluation and/or control device 10 additionally includes an electronic device 32 which is designed to establish information relating to a mechanically effective power of an active brake booster, taking into consideration at least a provided or ascertained first piece of information 34 relating to an assisting force that is effectuated by the operated active brake booster, a provided or ascertained second piece of information 36 relating to a pressure force in a master brake cylinder of the braking system, situated downstream from the active brake booster, the pressure force acting counter to the operated active brake booster, and a provided or ascertained third piece of information 38 relating to a spring force of at least one spring 22 of the active brake booster and/or of the braking system, the spring force acting counter to the operated active brake booster. (Examples of the pieces of information 34 through 38 are already mentioned above.)

The information relating to the mechanically effective power of the active brake booster may be taken into consideration when evaluating differential movement d. For example, electronic device 32 establishes the above-explained correction value $k_0$, $k_1$ or $k_2$ by taking into consideration the pieces of information 34 through 38. Based on correction value $k_0$, $k_1$ or $k_2$, preferably assisting force $F_{sup/c}$ that is actually effectuated with the aid of the operated electromechanical brake booster is ascertained. (Other method steps, which have already been explained above, may also be carried out by electronic device 32/evaluation and/or control device 10.)

Assisting force $F_{sup/c}$ that is actually effectuated may be used, together with a sensor signal 40 corresponding to differential movement d, to ascertain retention force Fr or to check whether retention force Fr still lies within a normal value range (which is defined for example on the basis of the differential movement d/sensor signal 40). If it is established that retention force Fr is too high, then at least one warning signal 42 may be output, with the aid of which a display or sound-emitting device is activatable and/or the motor of the active brake booster is deactivatable or controlled in a safety mode.

Evaluation and/or control device 10 thus enables a blocking of the brake actuation element 24 (which is already occurring or will soon occur) to be detected long before any jamming, crushing or forceful impacting of the object. Even slight contact between brake actuation element 24 and the object is sufficient for early detection/recognition of the fact that there is a risk situation relating to a possible retention or blocking of input rod 14 (or of brake actuation element 24). The early risk detection means that measures may be taken in good time to prevent jamming, crushing or forceful impacting of the object.

What is claimed is:

1. A method for ascertaining a piece of information relating to a mechanically effective power of an active brake booster of a braking system of a vehicle, comprising:
   ascertaining a first piece of information relating to an assisting force that is effectuated by the operated active brake booster;
   ascertaining a second piece of information relating to a pressure force in a master brake cylinder of the braking system, situated downstream from the active brake booster, the pressure force acting counter to the operated active brake booster;
   ascertaining a third piece of information relating to a spring force of at least one spring of the active brake booster and/or of the braking system, the spring force acting counter to the operated active brake booster;
   establishing the information relating to the mechanically effective power of the active brake booster, taking into consideration at least the first piece of information, the second piece of information and the third piece of information;
   wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and
   wherein a correction value that is at least one of: (i) averaged over time, or (ii) limited to a predefined correction value range, is established as the correction value.

2. A method for ascertaining a piece of information relating to a mechanically effective power of an active brake booster of a braking system of a vehicle, comprising:
   ascertaining a first piece of information relating to an assisting force that is effectuated by the operated active brake booster;
   ascertaining a second piece of information relating to a pressure force in a master brake cylinder of the braking system, situated downstream from the active brake booster, the pressure force acting counter to the operated active brake booster;
   ascertaining a third piece of information relating to a spring force of at least one spring of the active brake booster and/or of the braking system, the spring force acting counter to the operated active brake booster;
   establishing the information relating to the mechanically effective power of the active brake booster, taking into consideration at least the first piece of information, the second piece of information and the third piece of information;
   wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and
   wherein at least one of: (i) the information relating to the mechanically effective power of the active brake booster, or (ii) at least one initial value for the correction value, is established as a quotient of a sum of the pressure force ascertained as the second piece of information and of the spring force ascertained as the third piece of information, divided by the assisting force ascertained as the first piece of information.

3. A method for operating an active brake booster of a braking system of a vehicle, comprising:
   establishing a correction value relating to a mechanically effective power of the active brake booster by:

ascertaining a first piece of information relating to an assisting force that is effectuated by the operated active brake booster, ascertaining a second piece of information relating to a pressure force in a master brake cylinder of the braking system, situated downstream from the active brake booster, the pressure force acting counter to the operated active brake booster, ascertaining a third piece of information relating to a spring force of at least one spring of the active brake booster and/or of the braking system, the spring force acting counter to the operated active brake booster, establishing the information relating to the mechanically effective power of the active brake booster, taking into consideration at least the first piece of information, the second piece of information and the third piece of information, and establishing the correction value for ascertaining an assisting force that is actually effectuated with the aid of the operated active brake booster;

establishing a setpoint variable for a setpoint operating mode that is to be carried out by the active brake booster, taking into consideration at least a setpoint vehicle deceleration requested by a driver of the vehicle or by a speed controller of the vehicle, and taking into consideration the correction value; and actuating the active brake booster in such a way that the active brake booster is operated in an actual operating mode that corresponds to the established setpoint variable;

wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and wherein a correction value that is at least one of: (i) averaged over time, or (ii) limited to a predefined correction value range, is established as the correction value.

4. A method for operating an active brake booster of a braking system of a vehicle, comprising:

establishing a correction value relating to a mechanically effective power of the active brake booster by:

ascertaining a first piece of information relating to an assisting force that is effectuated by the operated active brake booster, ascertaining a second piece of information relating to a pressure force in a master brake cylinder of the braking system, situated downstream from the active brake booster, the pressure force acting counter to the operated active brake booster, ascertaining a third piece of information relating to a spring force of at least one spring of the active brake booster and/or of the braking system, the spring force acting counter to the operated active brake booster, establishing the information relating to the mechanically effective power of the active brake booster, taking into consideration at least the first piece of information, the second piece of information and the third piece of information, and establishing the correction value for ascertaining an assisting force that is actually effectuated with the aid of the operated active brake booster; and determining an assisting force that is actually effectuated with the aid of the operated active brake booster, taking into consideration the correction value;

wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and wherein a correction value that is at least one of: (i) averaged over time, or (ii) limited to a predefined correction value range, is established as the correction value.

5. The method as recited in claim 4, wherein a possible blocking of the active brake booster and/or of a brake actuation element connected to the active brake booster is ascertained by evaluating at least one ascertained sensor variable relating to a differential movement between an assisting force transmission component of the active brake booster and a driver braking force transmission component of the braking system and the assisting force that is actually effectuated with the aid of the operated active brake booster.

6. An evaluation and/or control device for at least one active brake booster of a braking system of a vehicle, comprising:

an electronic device which is configured to establish a piece of information relating to a mechanically effective power of the active brake booster, taking into consideration an at least provided or ascertained first piece of information relating to an assisting force that is effectuated with the aid of the operated active brake booster, a provided or ascertained second piece of information relating to a pressure force in a master brake cylinder of the braking system, situated downstream from the active brake booster, the pressure force acting counter to the operated active brake booster, and a provided or ascertained third piece of information relating to a spring force of at least one spring of the active brake booster and/or of the braking system, the spring force acting counter to the operated active brake booster;

wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and wherein a correction value that is at least one of: (i) averaged over time, or (ii) limited to a predefined correction value range, is established as the correction value.

7. An active brake booster for a braking system of a vehicle, comprising:

an evaluation and/or control device for at least one active brake booster of a braking system of a vehicle, including:

an electronic device which is configured to establish a piece of information relating to a mechanically effective power of the active brake booster, taking into consideration an at least provided or ascertained first piece of information relating to an assisting force that is effectuated with the aid of the operated active brake booster, a provided or ascertained second piece of information relating to a pressure force in a master brake cylinder of the braking system, situated downstream from the active brake booster, the pressure force acting counter to the operated active brake booster, and a provided or ascertained third piece of information relating to a spring force of at least one spring of the active brake booster and/or of the braking system, the spring force acting counter to the operated active brake booster;

wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and wherein a correction value that is at least one of: (i) averaged over time, or (ii) limited to a predefined correction value range, is established as the correction value.

8. The active brake booster as recited in claim 7, further comprising:

an assisting force transmission component which may be moved in a braking direction with the aid of the active brake booster that is actuated by the evaluation and/or control device; and a driver braking force transmission component which is attached to the assisting force transmission component in such a way that the assisting force transmission component, which is moved in the braking direction, may be moved until a differential movement between the driver braking force transmission component and the assisting force transmission component is reached that is equal to a predefined limiting differential movement with respect to the driver braking force transmission component, and the driver braking force transmission component being conjointly moved by the assisting force transmission component, which is moved in the braking direction, for as long as the conjoint movement of the driver braking force transmission component in the braking direction is counteracted by at most a retention force below a predefined threshold value.

9. The active brake booster as recited in claim 8, wherein at least one buffer element or spring element is situated on the driver braking force transmission component and/or on the assisting force transmission component in such a way that if, during the movement of the assisting force transmission component in the braking direction, the conjoint movement of the driver braking force transmission component in the braking direction is counteracted by a retention force above the predetermined threshold value, the differential movement between the assisting force transmission component, which is moved in the braking direction, and the driver braking force transmission component being increased with the aid of a deformation of the at least one buffer element or spring element beyond the predefined limiting differential movement.

10. A braking system for a vehicle, comprising:

an evaluation and/or control device for at least one active brake booster of a braking system of a vehicle, including:

an electronic device which is configured to establish a piece of information relating to a mechanically effective power of the active brake booster, taking into consideration an at least provided or ascertained first piece of information relating to an assisting force that is effectuated with the aid of the operated active brake booster, a provided or ascertained second piece of information relating to a pressure force in a master brake cylinder of the braking system, situated downstream from the active brake booster, the pressure force acting counter to the operated active brake booster, and a provided or ascertained third piece of information relating to a spring force of at least one spring of the active brake booster and/or of the braking system, the spring force acting counter to the operated active brake booster;

wherein at least one correction value is established for at least one of: (i) ascertaining an assisting force that is actually effectuated with the aid of the operated active brake booster, or (ii) predefining a setpoint operating mode of the active brake booster as at least part of the information relating to the mechanically effective power of the active brake booster; and wherein a correction value that is at least one of: (i) averaged over time, or (ii) limited to a predefined correction value range, is established as the correction value.

11. An evaluation and/or control device for at least one active brake booster of a braking system of a vehicle, comprising:

an electronic device which is configured to establish a piece of information relating to a mechanically effective power of the active brake booster, taking into consideration an at least provided or ascertained first piece of information relating to an assisting force that is effectuated with the aid of the operated active brake booster, a provided or ascertained second piece of information relating to a pressure force in a master brake cylinder of the braking system, situated downstream from the active brake booster, the pressure force acting counter to the operated active brake booster, and a provided or ascertained third piece of information relating to a spring force of at least one spring of the active brake booster and/or of the braking system, the spring force acting counter to the operated active brake booster;

wherein at least one correction value is established for at least one of: (i) ascertaining the assisting force that is actually effectuated with the aid of the operated active brake booster, or (ii) predefining a setpoint operating mode of the active brake booster as at least part of the information relating to the mechanically effective power of the active brake booster; and wherein at least one of: (i) the information relating to the mechanically effective power of the active brake booster, or (ii) at least one initial value for the correction value, is established as a quotient of a sum of the pressure force ascertained as the second piece of information and of the spring force ascertained as the third piece of information, divided by the assisting force ascertained as the first piece of information.

* * * * *